US012750073B2

(12) United States Patent
Poulin et al.

(10) Patent No.: US 12,750,073 B2
(45) Date of Patent: Sep. 29, 2026

(54) FRONT END MODULE AND WIRELESS DEVICE HAVING MULTIPLE PRE-AMPLIFIER BANDPASS FILTERS

(71) Applicant: SKYWORKS SOLUTIONS, INC., Irvine, CA (US)

(72) Inventors: Grant Darcy Poulin, Carp (CA); Jose Mari Elizalde Harrison, Newburyport, MA (US)

(73) Assignee: SKYWORKS SOLUTIONS, INC., Irvine, CA (US)

( * ) Notice: Subject to any disclaimer, the term of this patent is extended or adjusted under 35 U.S.C. 154(b) by 749 days.

(21) Appl. No.: 18/150,229

(22) Filed: Jan. 5, 2023

(65) Prior Publication Data

US 2023/0223964 A1 Jul. 13, 2023

Related U.S. Application Data

(60) Provisional application No. 63/297,494, filed on Jan. 7, 2022, provisional application No. 63/297,493, filed on Jan. 7, 2022.

(51) Int. Cl.
*H04B 1/00* (2006.01)

(52) U.S. Cl.
CPC .................................... *H04B 1/006* (2013.01)

(58) Field of Classification Search
CPC ...... H04B 1/005; H04B 1/006; H04B 1/0064; H04B 1/02; H04B 1/04; H04B 2001/0408; H04B 1/06; H04B 1/16; H04B 1/18; H04B 1/38; H04B 1/3827; H04B 1/40; H04B 1/401; H04B 1/406; H04B 1/44; H04B 1/48; H04B 1/54
See application file for complete search history.

(56) References Cited

U.S. PATENT DOCUMENTS

| | | | | |
|---|---|---|---|---|
| 8,374,557 | B2 | 2/2013 | Gorbachov | |
| 8,600,316 | B2 * | 12/2013 | Lum | H04B 1/006 455/552.1 |
| 9,826,423 | B2 * | 11/2017 | Emmanuel | H04W 52/243 |
| 10,425,982 | B2 * | 9/2019 | Yang | H04W 74/0816 |
| 10,643,962 | B1 * | 5/2020 | Ichitsubo | H04B 1/0458 |
| 10,673,513 | B2 * | 6/2020 | Shealy | H04B 1/006 |
| 11,102,790 | B2 | 8/2021 | Har-Zion et al. | |

(Continued)

FOREIGN PATENT DOCUMENTS

| | | | | |
|---|---|---|---|---|
| JP | 2008219868 A | | 9/2008 | |
| WO | WO-2012107656 A1 | * | 8/2012 | H04B 1/44 |

OTHER PUBLICATIONS

Le Naour et al., WO 201207656 A1, "Concurrent Access Dual-Band Terminal Operating in Two Adjacent Bands", Aug. 16, 2012, English Text. (Year: 2012).*

*Primary Examiner* — Quochien B Vuong
(74) *Attorney, Agent, or Firm* — Lando & Anastasi, LLP

(57) ABSTRACT

A front end module includes an antenna port, two or more bandpass filters forming a signal path with the antenna port, each of the bandpass filters having a different passband, one or more amplifiers, the one or more amplifiers being disposed between the two or more bandpass filters and the antenna port in the signal path, and one or more switches configured to connect one of the two or more bandpass filters to the one or more amplifiers. A corresponding wireless device and wireless access point are also provided.

20 Claims, 11 Drawing Sheets

(56) References Cited

U.S. PATENT DOCUMENTS

| | | | | |
|---|---|---|---|---|
| 2008/0205509 | A1 | 8/2008 | Le Naour et al. | |
| 2021/0184707 | A1* | 6/2021 | Hasnain ............... | H04B 1/0053 |
| 2022/0399909 | A1* | 12/2022 | Krishnamachari .. | H04B 1/0078 |
| 2023/0223965 | A1 | 7/2023 | Poulin et al. | |

* cited by examiner

FRONT END MODULE AND WIRELESS DEVICE HAVING MULTIPLE PRE-AMPLIFIER BANDPASS FILTERS

CROSS-REFERENCE TO RELATED APPLICATIONS

This application claims priority under 35 U.S.C. § 119(e) to U.S. Provisional Patent Application Ser. No. 63/297,493, titled "FRONT END MODULE AND WIRELESS DEVICE HAVING MULTIPLE PRE-AMPLIFIER BANDPASS FILTERS," filed Jan. 7, 2022, and to U.S. Provisional Application No. 63/297,494, titled "FRONT END MODULE AND WIRELESS DEVICE HAVING NO POST AMPLIFIER BANDPASS FILTER," filed Jan. 7, 2022, each of which is incorporated herein by reference in its entirety for all purposes.

BACKGROUND

Field

Aspects and embodiments disclosed herein relate to front end modules, such as for use in wireless devices and wireless access points. Aspects and embodiments disclosed herein also relate to wireless devices and wireless access points comprising said front end modules.

Description of the Related Technology

The Institute of Electrical and Electronics Engineers (IEEE) has mandated that Wi-Fi access points will need to support simultaneous transmit and receive (STR) operation across multiple radio links with the introduction of Multi Link Operation (MLO). A radio link is defined as two separate channels. With the availability of the 6 GHz band for Wi-Fi, most access points will use 5 GHz bands for one link and the 6 GHz band for a second link.

Due to the very close spacing between 5 GHz and 6 GHz bands, self-interference between the bands is a significant problem, where the transmit noise from a transmitter falls into the receive band of the co-located receiver, resulting in reduction of range and throughput.

SUMMARY

According to an aspect of the present disclosure there is provided a front end module comprising a bandpass filter, an antenna port for connection to an antenna and forming a signal path with the bandpass filter, and one or more amplifiers, the one or more amplifiers being disposed between the bandpass filter and the antenna port in the signal path.

In one example, the one or more amplifiers comprises a first amplifier disposed between the antenna port and the bandpass filter in the signal path, and a second amplifier disposed between the antenna port and the bandpass filter in the signal path. The front end module further comprises one or more switches arranged such that the front end module can be configured in either a transmit path configuration by selecting the first amplifier or a receive path configuration by selecting the second amplifier.

In one example, the one or more switches comprises a first switch disposed between the antenna port and the one or more amplifiers in the signal path and a second switch disposed between the bandpass filter and the one or more amplifiers in the signal path. The first switch and the second switch allow the front end module to be configured in either the transmit path configuration by selecting the first amplifier or the receive path configuration by selecting the second amplifier.

In one example, the first amplifier comprises a power amplifier.

In one example, the second amplifier comprises a low noise amplifier.

In one example, the bandpass filter is in a small signal side of the power amplifier of the front end module.

In one example, the bandpass filter is configured for use with Wi-Fi signals.

In one example, the bandpass filter is a 5 GHz bandpass filter or a 6 GHz bandpass filter.

According to another aspect of the present disclosure there is provided a wireless device comprising one more antennae and one or more front end modules, each front end module having a bandpass filter, an antenna port connected to one of the one or more antennae and forming a signal path with the bandpass filter, and one or more amplifiers. The one or more amplifiers are disposed between the bandpass filter and the antenna in the signal path.

In one example, the one or more amplifiers of each of the one or more front end modules comprises a first amplifier disposed between the antenna port and the bandpass filter of the front end module in the signal path and a second amplifier disposed between the antenna port and the bandpass filter of the front end module in the signal path. Each of the one or more front end modules further comprises one or more switches arranged such that the front end module can be configured in either a transmit path configuration by selecting the first amplifier or a receive path configuration by selecting the second amplifier.

In one example, the one or more switches of each of the one or more front end modules comprises a first switch disposed between the antenna port and the one or more amplifiers of the front end module in the signal path and a second switch disposed between the bandpass filter and the one or more amplifiers of the front end module in the signal path. The first switch and the second switch allow the front end module to be configured in either the transmit path configuration by selecting the first amplifier or the receive path configuration by selecting the second amplifier.

In one example, the first amplifier of each of the one or more front end modules comprises a power amplifier.

In one example, the second amplifier of each of the one or more front end modules comprises a low noise amplifier.

In one example, the bandpass filter of each of the one or more front end modules is in a small signal side of the power amplifier of the front end module.

In one example, the bandpass filter of each of the one or more front end modules is configured for use with Wi-Fi signals.

In one example, the one or more front end modules comprises one or more pairs of front end modules.

In one example, for each pair of front end modules, the bandpass filter of one front end module passes a different frequency range to the bandpass filter of the other front end module, such that the passbands of the bandpass filters do not overlap.

In one example, for each pair of front end modules, the bandpass filter of one front end module is a 5 GHz bandpass filter the bandpass filter of the other front end module is a 6 GHz bandpass filter.

In one example, for each pair of front end modules, the one or more amplifiers of one front end module is a power amplifier and the one or more amplifiers of the other front end module is a low noise amplifier.

In one example, the one or more front end modules comprises two or more pairs of front end modules.

In one example, the bandpass filters of one pair of front end modules are configured for use in a different geographical region to the bandpass filters of another pair of front end modules. This is a useful feature since different geographical regions may have different regulatory requirements with different allowed channels of operation.

In one example, the wireless device further comprises a region detector configured to detect a geographical region in which the wireless device is located and to automatically configure the wireless device for that geographical region by selecting a pair of front end modules configured for use in the detected geographical region for use in a transmit path configuration of the wireless device and a receive path configuration of the wireless device.

In one example, the one or more antennae comprises two or more antennae, at least two of the two or more antennae having different polarizations.

In one example, the one or more antennae comprises two or more antennae, at least two of the two or more antennae being different types of antenna.

In one example, the one or more antennae comprises two or more antennae, at least two of the two or more antennae having least 20 dB of isolation between them, wherein preferably there is at least 30 dB of between them, wherein more preferably there is at least 40 dB of isolation between them.

In one example, the wireless device is a wireless mobile device or a wireless access point.

According to another aspect of the present disclosure, there is provided a front end module comprising an antenna port, two or more bandpass filters forming a signal path with the antenna port, each of the bandpass filters having a different passband, one or more amplifiers, the one or more amplifiers being disposed between the two or more bandpass filters and the antenna port in the signal path, and one or more switches configured to connect one of the two or more bandpass filters to the one or more amplifiers.

In one example the one or more amplifiers comprises a first amplifier disposed between the antenna port and the one or more bandpass filters and a second amplifier disposed between the antenna port and the one or more bandpass filters. The one or more switches are further configured to either select the first amplifier to configure the front end module in a transmit path configuration or to select the second amplifier configure the front end module in a receive path configuration.

In one example the one or more switches comprise a first switch disposed between the antenna port and the one or more amplifiers and a second switch disposed between the two or more bandpass filters and the one or more amplifiers. The first switch and the second switch allow the front end module to be configured in either the transmit path configuration by selecting the first amplifier or the receive path configuration by selecting the second amplifier.

In one example the first amplifier comprises a power amplifier.

In one example the second amplifier comprises a low noise amplifier.

In one example the two or more bandpass filters are in a small signal side of the power amplifier of the front end module.

In one example the two or more bandpass filters are configured for use with Wi-Fi signals.

In one example the two or more bandpass filters comprise a first bandpass filter and a second bandpass filter, wherein the first bandpass filter passes a different range of frequencies to the second bandpass filter such that the passbands of the first bandpass filter and the second bandpass filter do not overlap.

In one example the first bandpass filter is a 5 GHz bandpass filter and the second bandpass filter is a 6 GHz bandpass filter.

In one example the two or more bandpass filters includes bandpass filters configured for use in at least two different geographical regions.

In one example the one or more amplifiers are wideband amplifiers configured to operate across at least the frequencies of the two or more bandpass filters.

In one example the one or more amplifiers are configured to operate in the linear regime across at least the frequencies of the two or more bandpass filters.

According to another aspect of the present disclosure there is provided a wireless device comprising one or more antennae and one or more front end modules, each front end module having an antenna port connected to one of the one or more antennae, two or more bandpass filters forming a signal path with the antenna port, each of the bandpass filters having a different passband, one or more amplifiers, the one or more amplifiers being disposed between the two or more bandpass filters and the antenna port in the signal path, and one or more switches configured to connect one of the two or more bandpass filters to the one or more amplifiers.

In one example the one or more amplifiers of each of the one or more front end modules comprises a first amplifier disposed between the antenna port and the one or more bandpass filters of the front end module and a second amplifier disposed between the antenna port and the one or more bandpass filters of the front end module. The one or more switches of each of the one or more front end modules are further configured to either select the first amplifier to configure the front end module in a transmit path configuration or to select the second amplifier configure the front end module in a receive path configuration.

In one example the one or more switches of each of the one or more front end modules comprises a first switch disposed between the antenna port and the one or more amplifiers of the front end module and a second switch disposed between the two or more bandpass filters and the one or more amplifiers of the front end module. The first switch and the second switch allow the front end module to be configured in either the transmit path configuration by selecting the first amplifier or the receive path configuration by selecting the second amplifier.

In one example the first amplifier of each of the one or more front end modules comprises a power amplifier.

In one example the second amplifier of each of the one or more front end modules comprises a low noise amplifier.

In one example the two or more bandpass filters of each of the one or more front end modules are in a small signal side of the power amplifier of the front end module.

In one example the two or more bandpass filters of each of the one or more front end modules are configured for use with Wi-Fi signals.

In one example, for each of the one or more front end modules, the two or more bandpass filters comprise a first bandpass filter and a second bandpass filter, wherein the first bandpass filter passes a different range of frequencies to the second bandpass filter such that the passbands of the first bandpass filter and the second bandpass filter do not overlap.

In one example, for each of the one or more front end modules, the first bandpass filter is a 5 GHz bandpass filter and the second bandpass filter is a 6 GHz bandpass filter.

In one example, for each of the one or more front end modules, the two or more bandpass filters includes bandpass filters configured for use in at least two different geographical regions.

In one example the wireless device further comprises a region detector configured to detect a geographical region in which the wireless device is located and to automatically configure the wireless device for that geographical region by selecting, from the one or more front end modules, a front end module having bandpass filters configured for use in the detected geographical region.

In one example, for each of the one or more front end modules, the one or more amplifiers are wideband amplifiers configured to operate across at least the frequencies of the two or more bandpass filters.

In one example, for each of the one or more front end modules, the one or more amplifiers are configured to operate in the linear regime across at least the frequencies of the two or more bandpass filters.

In one example the one or more antennae comprises two or more antennae, at least two of the two or more antennae having different polarizations.

In one example the one or more antennae comprises two or more antennae, at least two of the two or more antennae being different types of antenna.

In one example the one or more antennae comprises two or more antennae, at least two of the two or more antennae having least 20 dB of isolation between them, wherein preferably there is at least 30 dB of between them, wherein more preferably there is at least 40 dB of isolation between them.

In one example the wireless device is a wireless mobile device or a wireless access point.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Aspects and embodiments described herein are directed to a front end module, wireless device and wireless access point having no post amplifier bandpass filter, providing a more flexible and efficient device for transmitting and receiving wireless signals.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
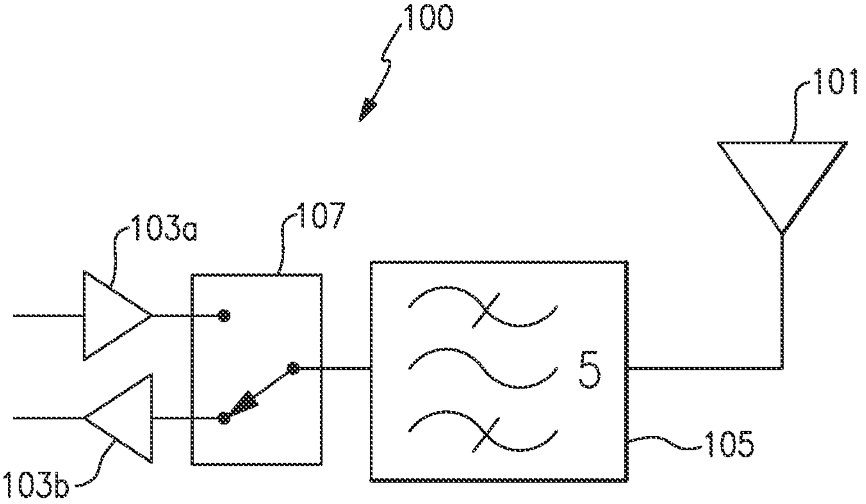
FIG. 1 is a front end module.

FIG. 1 illustrates schematic of a radio-frequency (RF) front end module (FEM) 100 connected to an antenna 101. As illustrated in FIG. 1, front end module 100 comprises amplifiers **103*a*, 103*b*, bandpass filter 105, and switch 107. However, it will be appreciated that this is a simplified representation of the front end module 100, and that in practice other, not illustrated, components may be incorporated into front end module 100**, including between illustrated components.

When incorporated into an electronic device, the front end module 100 typically will be connected to a transceiver as part of a transmit path, a receive path, or both. The front end module 100 illustrated can be incorporated as part of both the transmit path and the receive path by virtue of amplifiers **103*a*, 103*b* and switch 107. Amplifiers 103*a*, 103*b* include a power amplifier 103*a* for use in the transmit path and a low noise amplifier 103*b* for use in the receive path, whilst switch 107 allows either to be connected into a signal path incorporating the bandpass filter 105 and the antenna 101. In FIG. 1, the front end module is shown configured in a receive path state, with the low noise amplifier 103*b* shown connected into the signal path by switch 107**.

The bandpass filter 105, in this case a 5 GHz bandpass filter, only passes signals within its passband. That is, signals that are outside the passband of the bandpass filter 105 (out of band or OOB signals) are attenuated, typically by 50-60 dB, such that they are filtered out and are not passed down the signal path. One situation in which this is useful is when two or more antennae are used in proximity to each other, either on the same device or on another nearby device, to filter out unwanted incoming signals in a different band and to prevent transmitted signals from one antenna blocking the nearby antenna.

Figure 2:
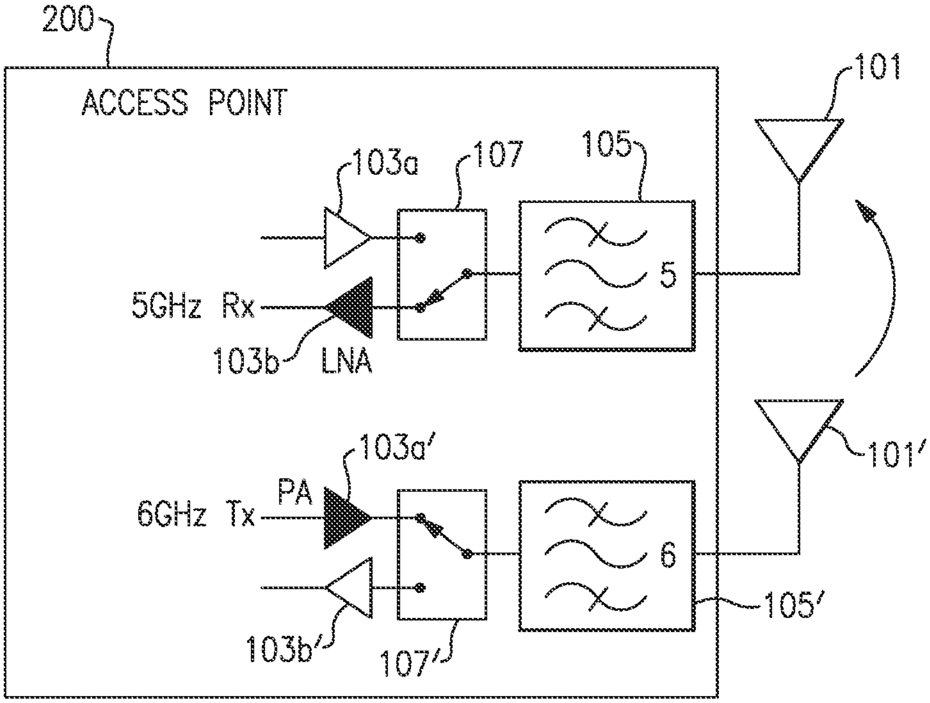
FIG. 2 is an access point.
Figure 3:
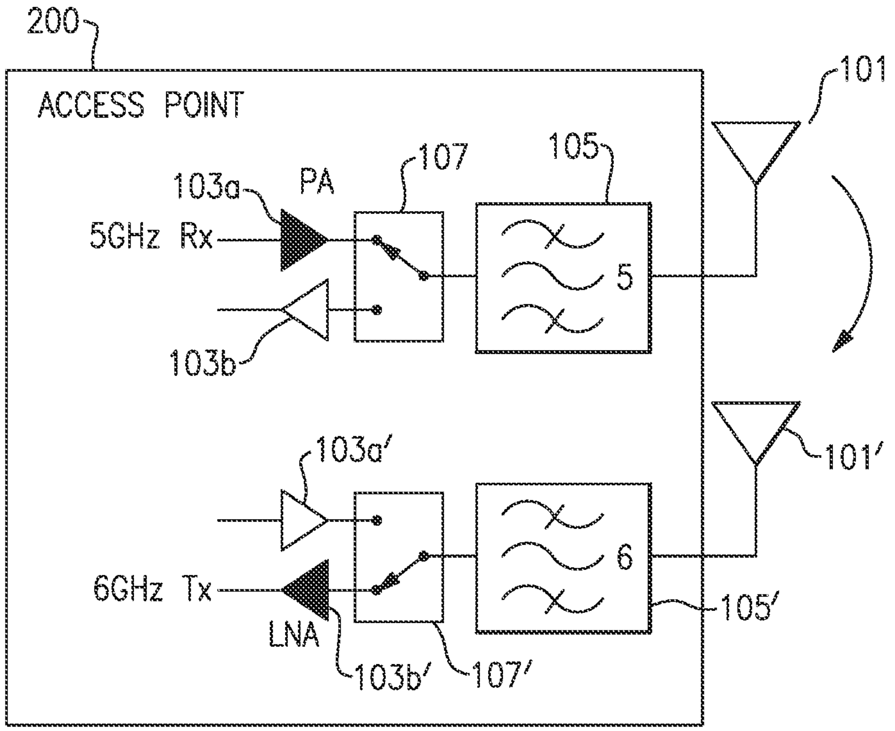
FIG. 3 is an access point.

FIGS. 2 and 3 are schematic illustrations of an access point 200 having two antennae 101, 101'. Each antenna 101, 101' has separate front end circuitry, similar to the front end module 100 shown in FIG. 1. However, the bandpass filters 105, 105' connected to each antenna 101, 101' have different passbands: bandpass filter 105 is a 5 GHz bandpass filter whilst bandpass filter 105' is a 6 GHz bandpass filter. As the front end circuitry for each antenna 101, 101' comprises a switch 107, 107' that can switch between a power amplifier 103*a*, 103*a'* and a low noise amplifier 103*b*, 103*b'*, each antenna can transmit and receive.

FIG. 2 illustrates the access point 200 configured with the 6 GHz antenna 101' front end circuitry in a transmit path (Tx) configuration and with the 5 GHz antenna 101 front end circuitry in a receive path (Rx) configuration. That is, bandpass filter 105' is connected, by switch 107', to power amplifier 103*a'* and bandpass filter 105 is connected, by switch 107, to low noise amplifier 103*b*. In this configuration, the 6 GHz bandpass filter 105' rejects out of band noise (including noise that is within the 5 GHz passband of bandpass filter 105) that would otherwise be received by antenna 101 and degrade the noise floor and cause desensitization of the low noise amplifier 103*b* in the 5 GHz signal path. FIG. 3, on the other hand, illustrates the access point 200 configured with the 5 GHz antenna 101 front end circuitry in a transmit configuration and with the 6 GHz antenna 101' front end circuitry in a receive path configuration. That is, bandpass filter 105' is connected, by switch 107', to low noise amplifier 103*b'* and bandpass filter 105 is connected, by switch 107, to power amplifier 103*a*. In this configuration, the 6 GHz bandpass filter 105' rejects 5 GHz signal leakage that would otherwise saturate low noise amplifier 103*b'* resulting in desensitization. It will be appreciated that the 5 GHz bandpass filter 105 also provides these benefits with respect to its associated circuitry.

However, bandpass filters, such as bandpass filters 105, 105', typically have losses of around 3 dB. As this loss is after the power amplifier 103*a*, 103*a'* in the transmit path this means that transmit power is reduced, reducing the effective range of the transmitter. Alternatively, more power is required to get an equivalent range when compared to a transmitter without a bandpass filter 105, 105'. Furthermore, placing a bandpass filter 105, 105' after a power amplifier 103*a*, 103*a'* can also degrade the performance of the power amplifier because of a poor match between the power amplifier 103*a*, 103*a'* and the impedance of the bandpass filter 105, 105' across the passband. It is difficult to design a wideband filter that has the desired impedance for operation with the power amplifier 103*a*, 103*a'*, typically 50Ω, across the entire passband. If the bandpass filter 105, 105' presents a poor match to the power amplifier 103*a*, 103*a'*, the linearity of the amplifier can be degraded. With respect to the bandpass filter 105, 105' in the receive path, because these are prior to the low noise amplifier 103*b*, 103*b'*, these bandpass filters 105, 105' degrade the noise figure, reducing the range at which a receiver can successfully receive a signal.

Figure 4:
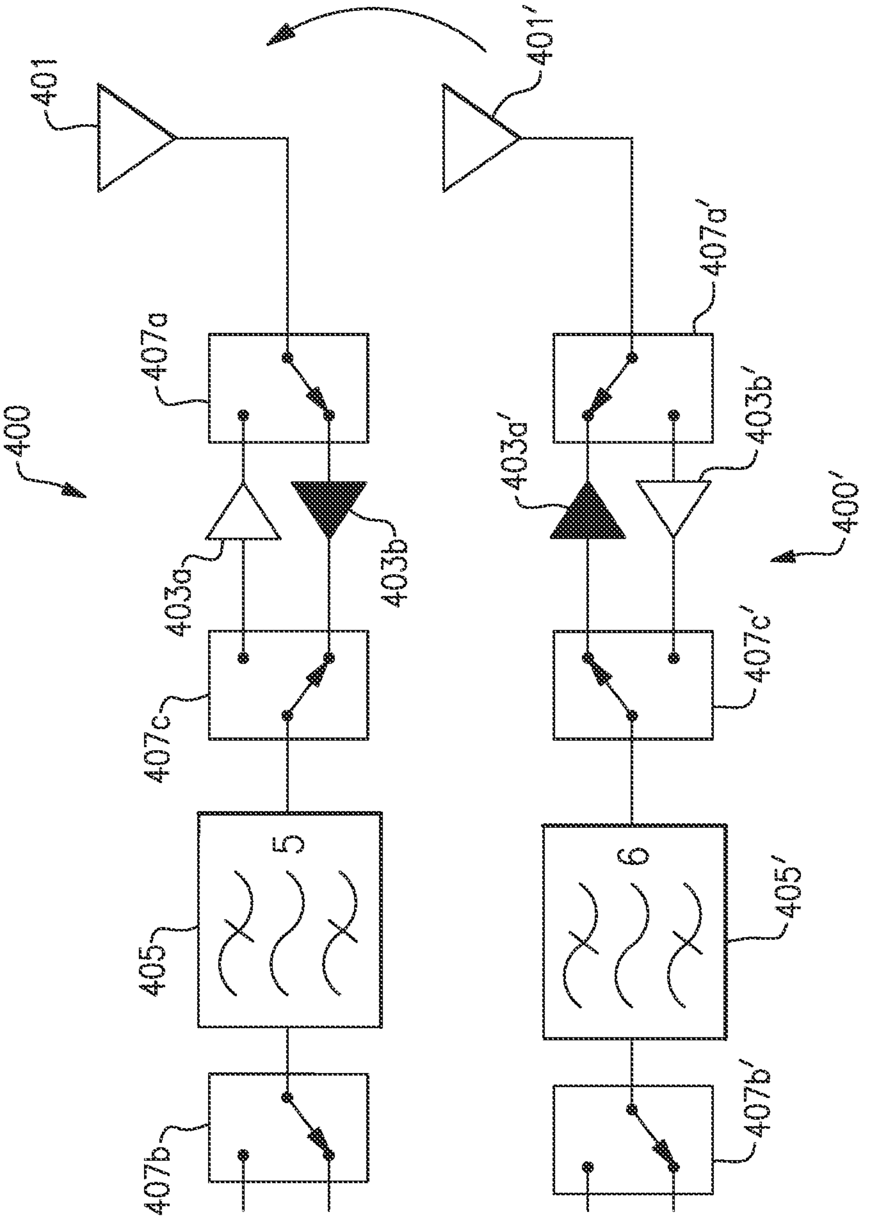
FIG. 4 is a pair of front end modules according to aspects of the disclosure.

Some or all of these problems, however, can be overcome by changing the placement of the bandpass filter. FIG. 4 illustrates a pair of front end modules 400, 400' that have their bandpass filters 405, 405' positioned on the small signal side of the amplifiers 403*a*, 403*a'*. That is, the amplifiers 403*a*, 403*b*, 403*a'*, 403*b'* are positioned between the bandpass filters 405, 405' and the antenna ports which connect the front end modules 400, 400' to their respective antennae 401, 401'.

Similarly to the front end modules of access point 200 illustrated in FIGS. 2 and 3, the front end modules 400, 400' illustrated in FIG. 4 each comprise both a power amplifier 403*a*, 403*a'* for use in a transmit path and a low noise amplifier 403*b*, 403*b'* for use in a receive path, as well as a plurality of switches 407*a*, 407*b*, 407*c*, 407*a'*, 407*b'*, 407*c'*, collectively referred to as switches 407, 407', that allow the correct signal path to be set through the front end modules 400, 400' so that they can be configured in a transmit path configuration or a receive path configuration. As can be seen, switch 407*a*, 407*a'* connects the antenna port, and hence the antenna 401, 401', to the correct path (i.e., to the correct amplifier 403*a* or 403*b*; 403*a'* or 403*b'*), whilst switches 407*b*, 407*b'* and 407*c*, 407*c'* cooperate to connect the bandpass filter 405, 405' into the correct signal path.

With regards to the transmit path configuration that front end module 400' is shown in, placing the bandpass filter 405' before the power amplifier 403*a'* reduces the losses in the signal path after the power amplifier 403*a'* (i.e., it reduces the losses in the signal that is going to be transmitted from the antenna 401'). Furthermore, by placing the bandpass filter 405' in the signal path prior to the amplification, smaller bandpass filters can be used that are less lossy, and the bandpass filters themselves will degrade less due to the smaller signals being handled. The bandpass filter 405' reduces the amount of noise prior to amplification, and so still helps prevent the transmission of out of band noise. Front end module 400 is shown in the receive configuration. On the receive side, placing the bandpass filter 405 after the low noise amplifier 403*b* reduces losses in the signal path before the low noise amplifier 403*b*, reducing the effect of noise on the small, received signal. The bandpass filter 405 protects the filters on a system on a chip to which the front end module 400 is connected (e.g., a transceiver module) from out of band signals amplified by the low noise amplifier 403*b*. Preferably, the bandpass filters 405, 405' have non-overlapping passbands to aid simultaneous transmission and receiving by being able to fully filter out signals in the band of the other.

Nevertheless, it will be appreciated that by removing the bandpass filter after the power amplifier 403*a*, 403*a'*, out of band noise generated by the power amplifier 403*a*, 403*a'* is no longer attenuated by the filter 405, 405'. Any out of band noise that couples from the transmitter in one band (e.g., from 401') to the receiver in the other band (e.g., to 401) will degrade the receiver's performance. By removing the bandpass filter from in front of the low noise amplifier 403*b*, 403*b'*, the low noise amplifier 403*b*, 403*b'* will be subjected to large out of band blockers signals. The transmit signal from one band (e.g., from 401') will couple to the low noise amplifier input and can degrade the linearity of the low noise amplifier. These potential issues can be addressed with a number of measures.

The transmit power of the power amplifier can be reduced, without reducing its saturated output power, moving it further away from its saturated output power. By doing this, the out of band noise produced by the power amplifier is significantly reduced. Operating at a lower transmit power will reduce the transmit range, but this can at least partially be compensated for by the reduction in post power amplification losses due to the removal of the post power amplifier bandpass filter.

The antenna isolation can be improved. With careful antenna design, antenna isolation of 40 dB or more can be achieved. This improves both transmit path out of band noise (since less out of band power is coupled into the victim receiver) and receive path saturation (since less transmit power is coupled to the receiver). Antennae can be isolated using a number of measures, such as by increasing their physical spacing, using different polarizations for different antennae, using different types of antennae, or any other techniques known in the art.

The linearity of the receivers can be improved by increasing the low noise amplifier's input third order intercept point (IIP3). Providing a large, more linear region of operation for the receive path low noise amplifiers helps to counteract the fact that they are amplifier out of band signals received prior to the out of band signals being filtered out by the bandpass filter on the receive path.

FIGS. 5 to 8 show the results of simulations comparing the placement of the bandpass filters before and after the amplifiers. For each figure, the top graph presents the results of the simulation having no bandpass filter between the amplifiers and the antenna and instead having the bandpass filters on the small signal side of the power amplifier of the amplifiers (e.g., the set-up of FIG. 4), whereas the bottom graph presents the results of the simulation having the bandpass filter located between the amplifiers and the antenna (e.g., the set-up of FIGS. 2 and 3). Additionally, the simulations are for simultaneous transmission and receiving, and for each figure, the thick line represents how the transmit range varies with respect to transmit power at the antenna, whereas the thin line represents how the receive range (i.e., at what distance from a wireless station the receiver can receive the signal) varies with the transmit power at the simultaneously transmitting antenna. It is noted that the transmit power is the power at the antenna, though, as discussed above, when a bandpass filter is located between the power amplifier and the antenna, the bandpass filter introduces losses that must be compensated for to get an equivalent power at the antenna. Hence, for the same transmit power at the antenna, the set-up having a post amplifier bandpass filter (i.e., the lower graph) will require more power to be delivered from the power amplifier.

The simulations were performed with the following parameters and assumptions:

- The access point has 40 dB antenna isolation between the 5 and 6 GHz chains;
- The power amplifier has a saturation power, $P_{sat}$, of 30 dBm;
- The access point uses 4 transmit streams;
- The transmit signal is 160 MHz in the 6 GHz channel on channel 15 (6,025 MHz) and the receive signal is 20 MHz in the 5 GHz channel 177 (5,885 MHz);
- Post power amplifier losses are 1 dB with the bandpass filter between system on a chip and the front end module (i.e., no post amplifier bandpass filter), and 4 dB with the bandpass filter placed between the amplifiers and the antenna;
- The bandpass filter is a bulk acoustic wave (BAW) filter having 30 dB rejection at 50 MHz offset and 3 dB loss;
- The access point low noise amplifier has IIP3=+8 dBm; and
- The mobile station transmits data to the access point at a power of 16 dBm with an error vector magnitude (EVM) of-50 dB.

The different figures, FIGS. 5 to 8, show the simulations performed operating at different quadrature amplitude modulation (QAM) modes.

Figure 5:
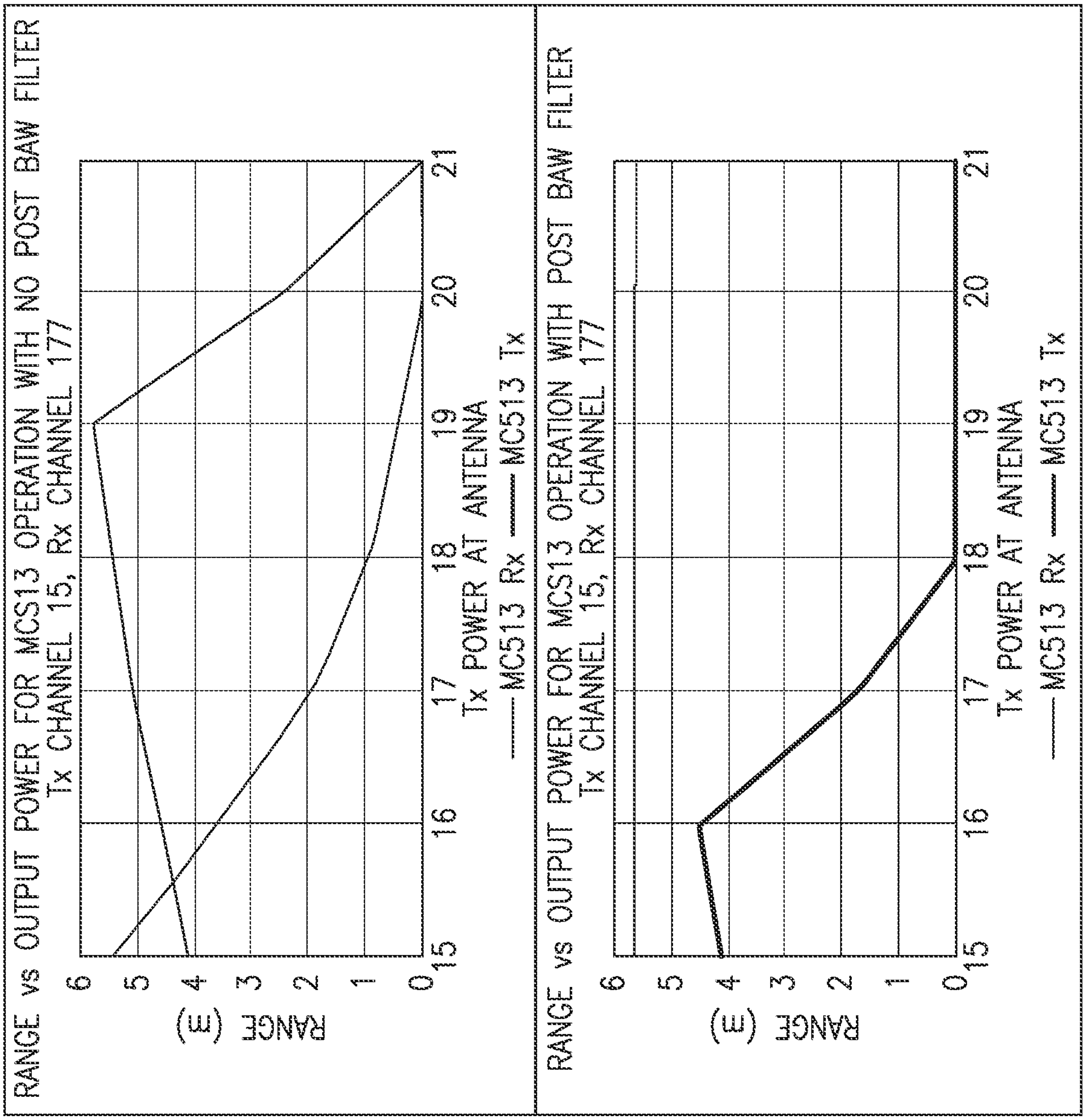
FIG. 5 is a graph showing results of a simulation of a front end module according to aspects of the disclosure.

Looking first at FIG. 5, the top chart shows simulated range for MCS13 (4,096QAM) operation as a function of transmit power (Tx power) with the filter placed between the system on a chip and the front end module, that is, with no post amplifier bandpass filter. Range for both transmit (from the access point to the mobile station) and receive (at the access point from the mobile station) are shown.

At 15 dBm transmit power, the transmit range is 4.1 m and the receive range is 5.4 m. As the transmit power is increased, the MCS13 receive range decreases due to increased out of band noise from the transmit path power amplifier that is incorporated into the transmission from the transmission antenna and is received at the receiving antenna and which degrades the linearity of the receiver low noise amplifier. With the parameters and assumptions described above, MCS13 cannot be received for transmit powers exceeding 20 dBm due to excessive out of band noise. The transmit range increases as power increases until 19 dBm, at which point the power amplifier linearity starts to degrade. By 21 dBm, the power amplifier's EVM is no longer able to support MCS13 operation.

The bottom chart shows transmit power rate vs range when the bandpass filter is placed after the power amplifier. The transmit range is 4.1 m at 15 dBm. Beyond 16 dBm, the transmit range degrades quickly because the power amplifier's linearity has degraded due to the additional post power amplifier losses of the bandpass filter. The receive range remains constant at 5.6 m, regardless of transmit power. This is expected since the bandpass filter will reject all noise from the receive path (before the received signal is processed or amplified at all), making the receiver independent of transmit power (as all received transmit signal is rejected). Note that the receive range of 5.6 m for this solution (for all transmit powers) is comparable to the range seen when the filter is placed between the system on a chip and the front end module (top graph). This occurs because the noise figure is improved by moving the filter to be placed after the low noise amplifier, and this compensates for the degradation due to the out of band noise.

As can be seen by comparing the top and bottom graphs of FIG. 5, in both examples the optimum region for transmit power is around 15-16 dBm, giving similar transmit ranges of around 4.5 m. In the bottom graph, it can be seen that the receive range is always greater than the transmit range, though this additional range is effectively wasted as two-way communication is not possible if the access point is not also in transmit range of the mobile station. Hence, the transmit range is the limiting factor and is greatest at about 4.5 m at 16 dBm. In the top graph, the transmit and receive ranges are equal at about 4.5 m at approximately 15.6 dBm transmit power. At lower powers, the transmit range is the limiting factor, whilst at higher powers the receive range is limiting. It can therefore be seen that both set-ups give approximately the same maximum range. However, with the bandpass filter placed prior to the amplifiers (e.g., as per FIG. 4), this is achieved using less transmit power at the antenna, which equates to an even greater saving in input power when account is taken for the losses in the bottom graph due to the post amplifier bandpass filter.

Figure 6:
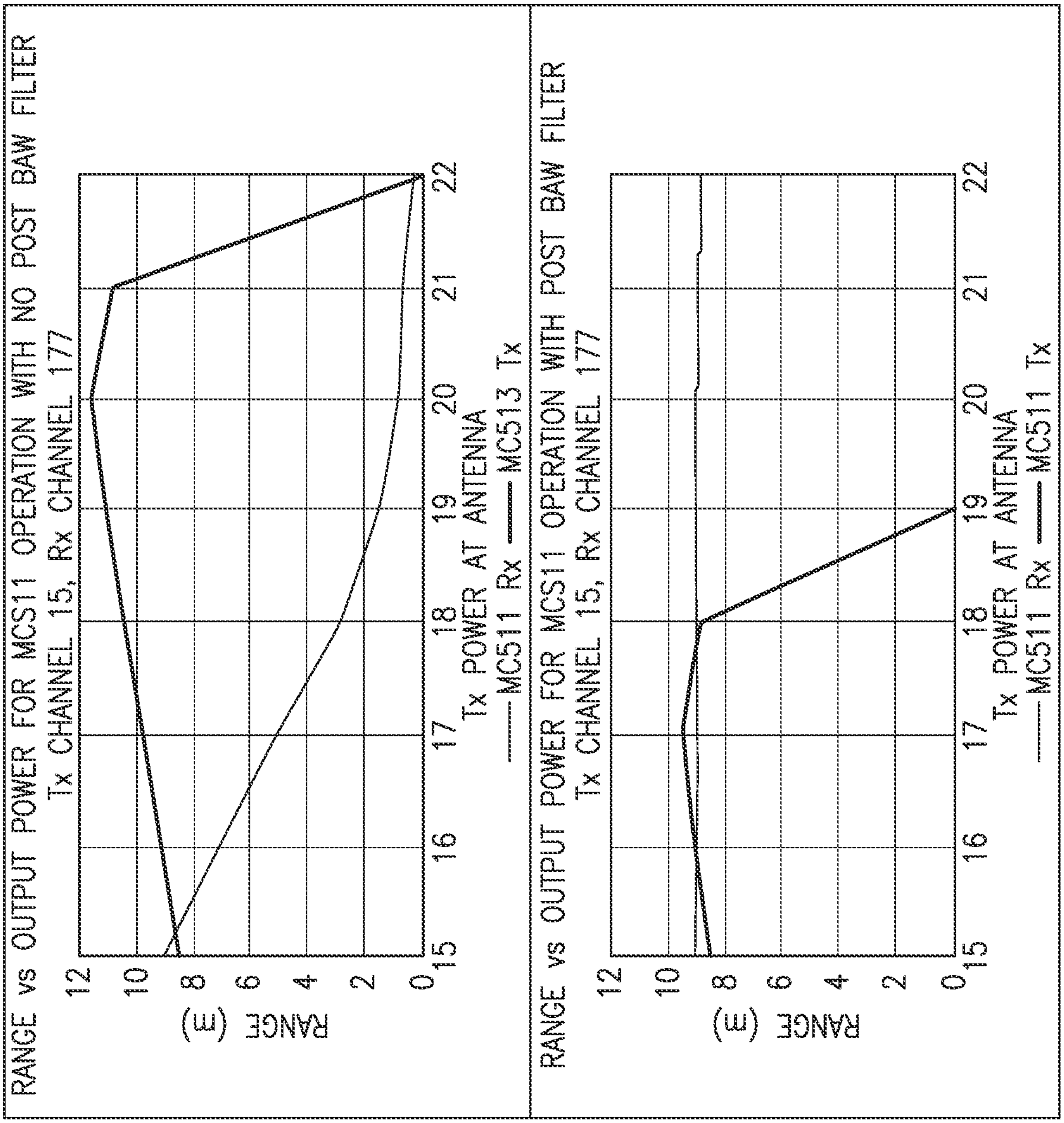
FIG. 6 is a graph showing results of a simulation of a front end module according to aspects of the disclosure.
Figure 7:
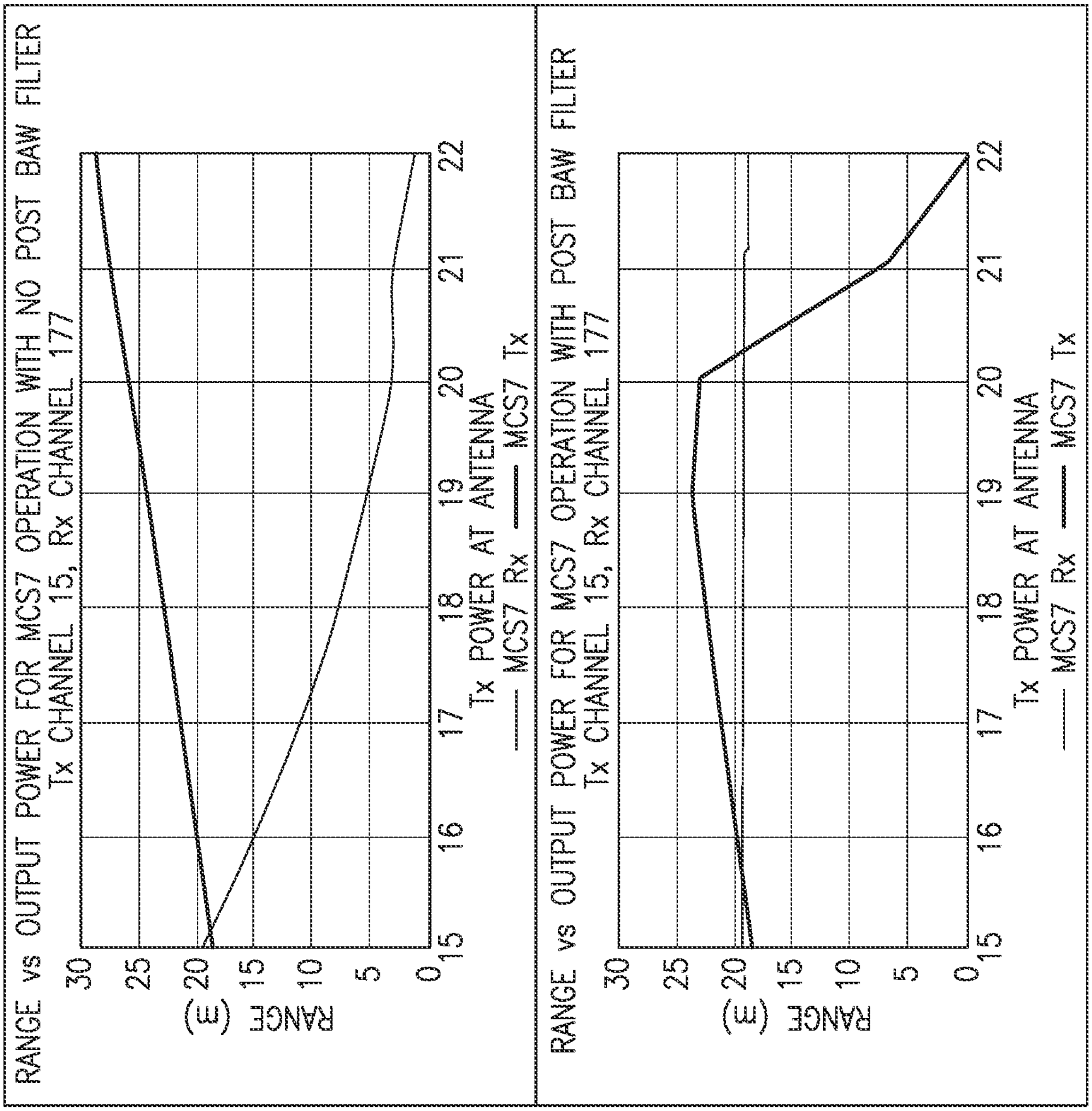
FIG. 7 is a graph showing results of a simulation of a front end module according to aspects of the disclosure.
Figure 8:
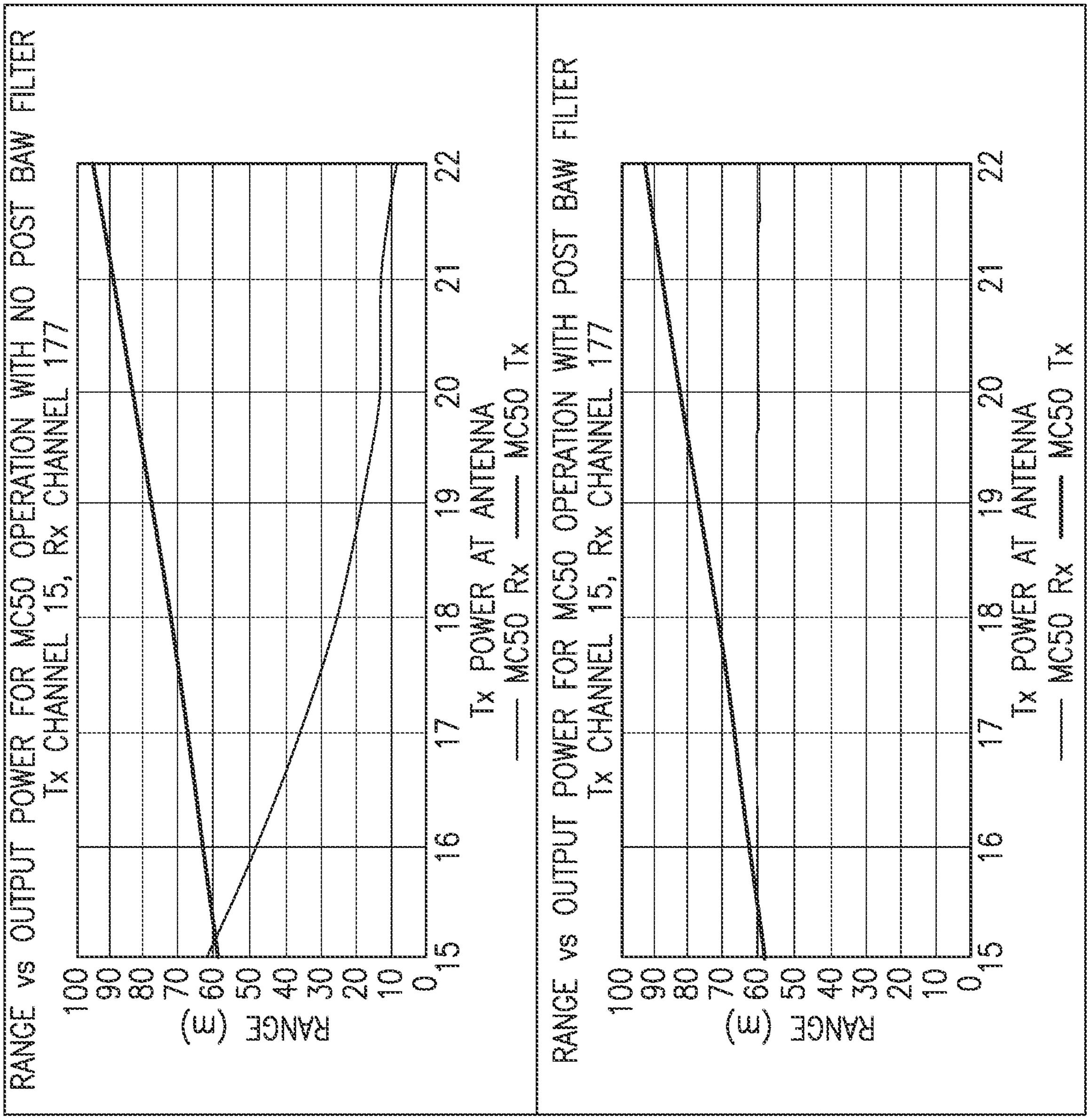
FIG. 8 is a graph showing results of a simulation of a front end module according to aspects of the disclosure.

Turning to FIG. 6, similar conclusions are seen for MCS11 operation (1,024 QAM). The equivalent range is achieved for low transmit powers in both the receive path and transmit path when the bandpass filter is placed between the system on a chip and the front end module (e.g., FIG. 4) instead of between the front end module and the antenna (e.g., FIGS. 2 and 3). This is also the case for lower order modulations shown in FIG. 7 (MCS7 operation; 64 QAM) and 8 (MCSO operation).

Figure 9:
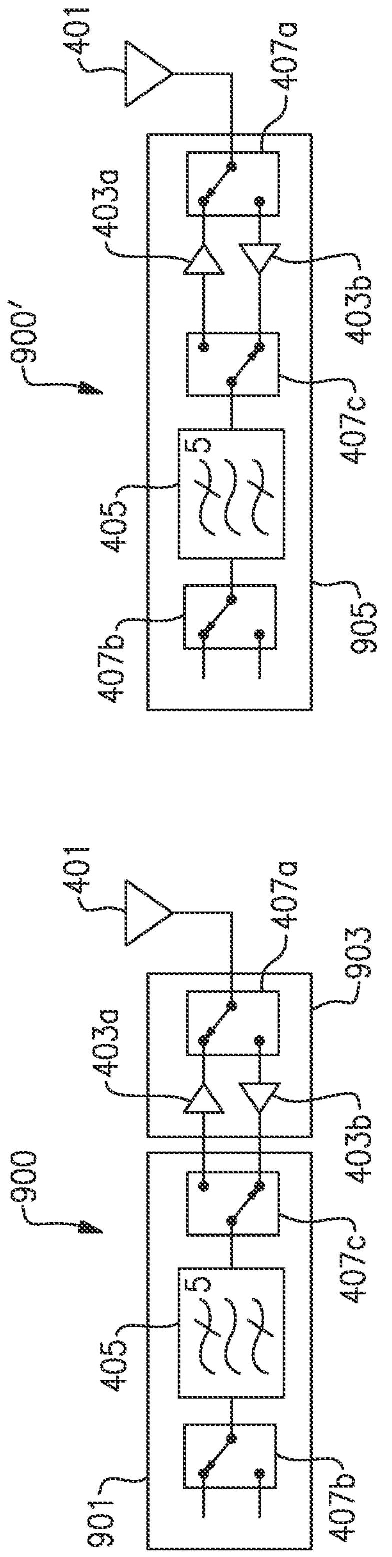
FIG. 9 is a pair of front end modules according to aspects of the disclosure.

A front end module having the bandpass filter on the small signal side of the power amplifier rather than after the power amplifier can be implemented in a number of different ways, depending upon various considerations such as manufacturing ease, existing module designs, flexibility of module design, and the like. FIG. 9 illustrates two exemplary front end modules 900, 900'. Each front end module 900, 900' is generally the same configuration of FIG. 4 and comprises a bandpass filter 405, an antenna port connected to an antenna 401, and amplifiers 403 disposed between the bandpass filter 405 and the antenna port. The amplifiers 403, comprising power amplifier 403*a* in the transmit path and low noise amplifier 403*b* in the receive path, are connected to the antenna port, and hence antenna 401, via switch 407*a*. Bandpass filter 405 is connected with switches 407*b* and 407*c*. The switches 407*a*, 407*b*, 407*c*, collectively, switches 407, allow the front end module 900, 900' to be configured in a transmit path configuration by connecting the power amplifier 403*a* into the signal path or in a receive path configuration by connecting the low noise amplifier 403*b* into the signal path.

Front end modules 900, 900' differ, however, in that front end module 900' comprises a single integrated front end module sub-unit 905 whereas front end module 900 comprises a bandpass filter front end module sub-unit 901 and an amplifier front end module sub-unit 903. Making a front end module 900' comprising a single integrated front end module sub-unit 905, having the bandpass filter 405 and the amplifiers 403 therein, may mean that the front end module 900' can be made more efficient and compact. However, separate front end modules 900' would then be utilized for operation in different bands, for example, at 5 GHz and at 6 GHz, potentially increasing manufacturing costs and reducing the flexibility of the front end module 900'. On the other hand, having a front end module 900 with a separate bandpass filter front end module sub-unit 901 and amplifier front end module sub-unit 903 allows the flexibility of the front end module 900 to be increased. This is because the band in which the front end module 900 is configured to operate can easily be changed by switching the bandpass filter front end module sub-unit 901 to one with a bandpass filter having a different passband, without needing to change the amplifier front end module sub-unit 903. Similarly, manufacturing may be simplified as the same amplifier front end module sub-unit 903 may be used across front end modules 900 having different passbands. However, the front end module 900 may be less compact and less efficient by having a separate bandpass filter front end module sub-unit 901 and amplifier front end module sub-unit 903.

While the front end modules of FIGS. 4 and 9 are each configured to work in a single band, multiple bandpass filters can be incorporated into a front end module to give a flexible architecture capable of operating across multiple bands.

Figure 10:
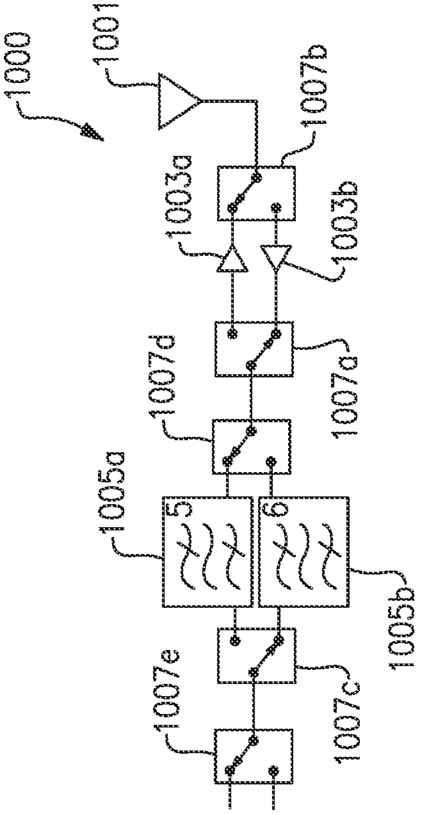
FIG. 10 is a front end module according to aspects of the disclosure.

FIG. 10 illustrates a front end module 1000 having a dual band architecture. The front end module 1000 is generally similar to that of FIGS. 4 and 9, and comprises amplifiers, including power amplifier 1003*a* and low noise amplifier 1003*b*, connected to an antenna port which connects the front end module 1000 to antenna 1001. However, instead of a single band pass filter, the dual band front end module 1000 comprises a first bandpass filter 1005*a* and a second bandpass filter 1005*b*. These bandpass filters 1005*a*, 1005*b* have different passbands. In this example bandpass filter 1005*a* has a 5 GHz passband and bandpass filter 1005*b* has a 6 GHz passband. Either bandpass filter 1005*a*, 1005*b* can be incorporated into either the transmit path or the receive path using switches 1007*c*, 1007*d*. Switches 1007*a*, 1007*b* and 1007*e* allow the front end module 1000 to be configured into either a transmit path configuration or a receive path configuration. Switches 1007*e* and 1007*c*, and switches 1007*d* and 1007*a* are shown as separate single-pole double-throw switches. However, it will be apparent to those skilled in the art that these could also be implemented as double-pole double-throw switches.

In the dual band architecture of FIG. 10, with multiple bandpass filters 1005*a*, 1005*b*, it is preferable that the amplifiers 1003*a*, 1003*b* are wideband amplifiers configured to be used across the entire spectrum covered by the bandpass filters 1005*a*, 1005*b*. That is, in this example, the amplifiers 1003*a*, 1003*b* are configured for use across both the 5 GHz and the 6 GHz bands. In particular, it is preferable that the amplifiers 1003*a*, 1003*b* are configured to operate in the linear regime across the bands passed by the bandpass filters 1005*a*, 1005*b*.

Two such identical front end modules 1000 can be incorporated into a wireless device to allow for simultaneous transmission and receiving in the two bands covered by the bandpass filters 1005*a*, 1005*b*. In this case, it is preferable that the bandpass filters 1005*a*, 1005*b* have non-overlapping passbands.

Whilst FIG. 10 illustrates a front end module 1000 having two bandpass filters 1005*a*, 1005*b* that can be incorporated into the signal path, it is envisaged that any number of bandpass filters can be provided for selection. For example, three, four, five, ten or another number of bandpass filters could be provided, and switches can be provided that allow any of these bandpass filters to be incorporated into the signal path. This can enable a wireless device to be configured for use with a number of different bands, allowing the wireless device to be used in a number of different regions that have defined different operational bands for wireless communication. In some examples, such a wireless device may have a region detection module that can detect the region the wireless device is located in and automatically configure the wireless device for use in that region by selecting appropriate bandpass filters for the transmit and receive paths. By placing the bandpass filters on the small-signal side of the power amplifier, the additional losses incurred by using switches with high throw counts do not significantly impact performance on either the transmitter or receiver, and this architecture therefore allows for higher complexity switching to be deployed.

Figure 11:
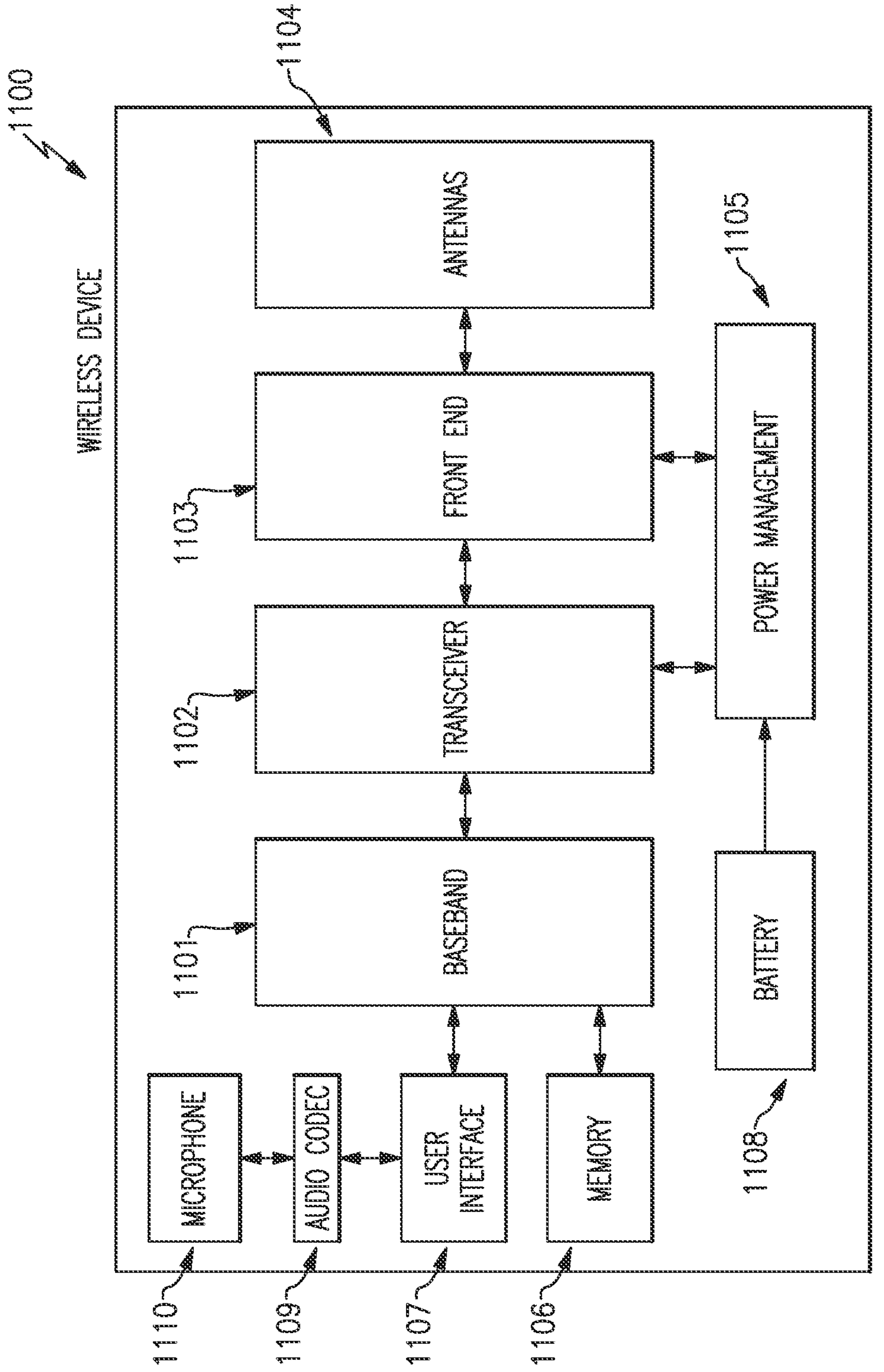
FIG. 11 is a schematic of a wireless device incorporating aspects of the disclosure.

FIG. 11 is a schematic diagram of a wireless device 1100 that can incorporate aspects of disclosed herein. The wireless device 1100 can be, for example but not limited to, a wireless access point, such as a router, or a portable telecommunication device, such as a mobile cellular-type telephone. The wireless device 1100 can include a microphone arrangement 1110, and may include one or more of a baseband system 1101, a transceiver 1102, a front end system 1103, one or more antennae 1104, a power management system 1105, a memory 1106, a user interface 1107, a battery 1108, and audio codec 1109. The microphone arrangement 1110 may supply signals to the audio codec 1109 which may encode analog audio as digital signals or decode digital signals to analog. The audio codec 1109 may transmit the signals to a user interface 1107. The user interface 1107 transmits signals to the baseband system 1101. The transceiver 1102 generates RF signals for transmission and processes incoming RF signals received from the antennae. The front end system 1103 aids in conditioning signals transmitted to and/or received from the antennae 1104. The antennae 1104 can include antennae used for a wide variety of types of communications. For example, the antennae 1104 can include antennae 1104 for transmitting and/or receiving signals associated with a wide variety of frequencies and communications standards. The baseband system 1101 is coupled to the user interface to facilitate processing of various user input and output, such as voice and data. The baseband system 1101 provides the transceiver 1102 with digital representations of transmit signals, which the transceiver 1102 processes to generate RF signals for transmission. The baseband system 1101 also processes digital representations of received signals provided by the transceiver 1102.

As shown in FIG. 11, the baseband system 1101 is coupled to the memory 1106 to facilitate operation of the wireless device 1100. The memory 1106 can be used for a wide variety of purposes, such as storing data and/or instructions to facilitate the operation of the wireless device 1100 and/or to provide storage of user information. The power management system 1105 provides a number of power management functions of the wireless device 1100. The power management system 1105 receives a battery voltage from the battery 1108. The battery 1108 can be any suitable battery for use in the wireless device, including, for example, a lithium-ion battery. In other cases, however, the battery 1108 may instead be replaced by a mains electricity connection. Aspects and embodiments of front end modules as described herein may be incorporated into the wireless device 1100 of FIG. 11, and in particular may be used as the front end system 1103.

It will be appreciated that the front end modules described herein, and, for example, used in wireless device 1100, can be arranged in a number of ways for different applications. For example, four 5 GHz front end modules and four 6 GHz front end modules (i.e., four pairs of front end modules 400, 400' illustrated in FIG. 4) can be used to enable simultaneous transmission and receiving with 4×4 multiple input, multiple output (MIMO) in both the 5 GHz and 6 GHz bands. Alternatively, eight dual band (or higher band) front end modules 1000, such as those illustrated in FIG. 10, can be utilized. This can provide a highly flexible 4×4 MIMO design allowing simultaneous transmission and receiving across different bands as determined by the bandpass filters utilized in the dual band front end modules.

The front end modules described herein may be configured to operate with different types of wireless communication, including but not limited to Wi-Fi (including Wi-Fi 7), LTE, 4G, 5G, and 6G.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the present disclosure. Accordingly, the foregoing description and drawings are by way of example only, and the scope of the invention should be determined from proper construction of the appended claims, and their equivalents.

What is claimed is:

1. A front end module comprising:

an antenna port;

two or more bandpass filters forming a signal path with the antenna port, each of the bandpass filters having a different passband;

one or more amplifiers, the one or more amplifiers being disposed between the two or more bandpass filters and the antenna port in the signal path; and one or more switches configured to connect one of the two or more bandpass filters to the one or more amplifiers, the one or more switches including a first switch coupled to the one or more amplifiers and directly coupled to the antenna port.

2. The front module of claim 1 wherein the one or more amplifiers comprises:

a first amplifier disposed between the antenna port and the two or more bandpass filters; and a second amplifier disposed between the antenna port and the two or more bandpass filters, the one or more switches being further configured to either select the first amplifier to configure the front end module in a transmit path configuration or to select the second amplifier configure the front end module in a receive path configuration.

3. The front end module of claim 2 wherein the first switch and a second switch allow the front end module to be configured in either the transmit path configuration by selecting the first amplifier or the receive path configuration by selecting the second amplifier.

4. The front end module of claim 2 wherein the first amplifier comprises a power amplifier and wherein the second amplifier comprises a low noise amplifier.

5. The front end module of claim 1 wherein the two or more bandpass filters are in a small signal side of the power amplifier in the front end module.

6. The front end module of claim 1 wherein the one or more amplifiers includes a power amplifier, and wherein transmit power of the power amplifier is reduced without affecting the saturated output power of the power amplifier.

7. The front end module of claim 1 wherein the two or more bandpass filters comprise a first bandpass filter and a second bandpass filter, wherein the first bandpass filter passes a different range of frequencies to the second bandpass filter such that the passbands of the first bandpass filter and the second bandpass filter do not overlap.

8. The front end module of claim 7 wherein the first bandpass filter is a 5 GHz bandpass filter and wherein the second bandpass filter is a 6 GHz bandpass filter.

9. The front end module of claim 1 wherein the two or more bandpass filters includes bandpass filters configured for use in at least two different geographical regions.

10. The front end module of claim 1 wherein the one or more amplifiers are wideband amplifiers configured to operate across at least the frequencies of the two or more bandpass filters.

11. The front end module of claim 10 wherein the one or more amplifiers are configured to operate in the linear regime across at least the frequencies of the two or more bandpass filters.

12. A front end module comprising:

an antenna port;

two or more bandpass filters forming a signal path with the antenna port, each of the bandpass filters having a different passband;

one or more amplifiers, the one or more amplifiers being disposed between the two or more bandpass filters and the antenna port in the signal path, the one or more amplifiers including a first amplifier disposed between the antenna port and the two or more bandpass filters, and a second amplifier disposed between the antenna port and the two or more bandpass filters; and one or more switches configured to connect one of the two or more bandpass filters to the one or more amplifiers, the one or more switches including a first switch coupled to the one or more amplifiers and directly coupled to the antenna port, the one or more switches further including a second switch coupled to the one or more amplifiers and to a third switch, the third switch being coupled to the two or more bandpass filters, a fourth switch and a fifth switch, the fourth switch being coupled to the fifth switch and to the two or more bandpass filters, and the fifth switch further being coupled to at least one transmit node and at least one receive node.

13. A wireless device comprising:

one or more antennae; and one or more front end modules, each front end module having an antenna port connected to one of the one or more antennae;

two or more bandpass filters forming a signal path with the antenna port, each of the bandpass filters having a different passband;

one or more amplifiers, the one or more amplifiers being disposed between the two or more bandpass filters and the antenna port in the signal path; and one or more switches configured to connect one of the two or more bandpass filters to the one or more amplifiers, the one or more switches including a first switch coupled to the one or more amplifiers and coupled directly to the antenna port.

14. The wireless device of claim 13 wherein the one or more amplifiers of each of the one or more front end modules comprises:

a first amplifier disposed between the antenna port and the two or more bandpass filters of the front end module; and a second amplifier disposed between the antenna port and the two or more bandpass filters of the front end module, the one or more switches of each of the one or more front end modules being further configured to either select the first amplifier to configure the front end module in a transmit path configuration or to select the second amplifier configure the front end module in a receive path configuration.

15. The wireless device of claim 14 wherein the one or more switches of each of the one or more front end modules comprises:

a first switch disposed between the antenna port and the one or more amplifiers of the front end module; and a second switch disposed between the two or more bandpass filters and the one or more amplifiers of the front end module, the first switch and the second switch allowing the front end module to be configured in either the transmit path configuration by selecting the first amplifier or the receive path configuration by selecting the second amplifier.

16. The wireless device of claim 13 wherein, for each of the one or more front end modules, the two or more bandpass filters comprise a first bandpass filter and a second bandpass filter, wherein the first bandpass filter passes a different range of frequencies to the second bandpass filter such that the passbands of the first bandpass filter and the second bandpass filter do not overlap.

17. The wireless device of claim 16 wherein, for each of the one or more front end modules, the first bandpass filter is a 5 GHz bandpass filter and the second bandpass filter is a 6 GHz bandpass filter.

18. The wireless device of claim 13 wherein, for each of the one or more front end modules, the two or more bandpass filters includes bandpass filters configured for use in at least two different geographical regions.

19. The wireless device of claim 18 further comprising a region detector configured to detect a geographical region in which the wireless device is located and to automatically configure the wireless device for that geographical region by selecting, from the one or more front end modules, a front end module having bandpass filters configured for use in the detected geographical region.

20. The wireless device of claim 13 wherein the one or more antennae comprises two or more antennae, at least two of the two or more antennae being different types of antenna or having different polarizations.

* * * * *